June 30, 1970     K. A. NORDEBO     3,518,473
ALTERNATING CURRENT GENERATOR WITHOUT SLIP RINGS AND BRUSHES
Filed May 24, 1968     3 Sheets-Sheet 1
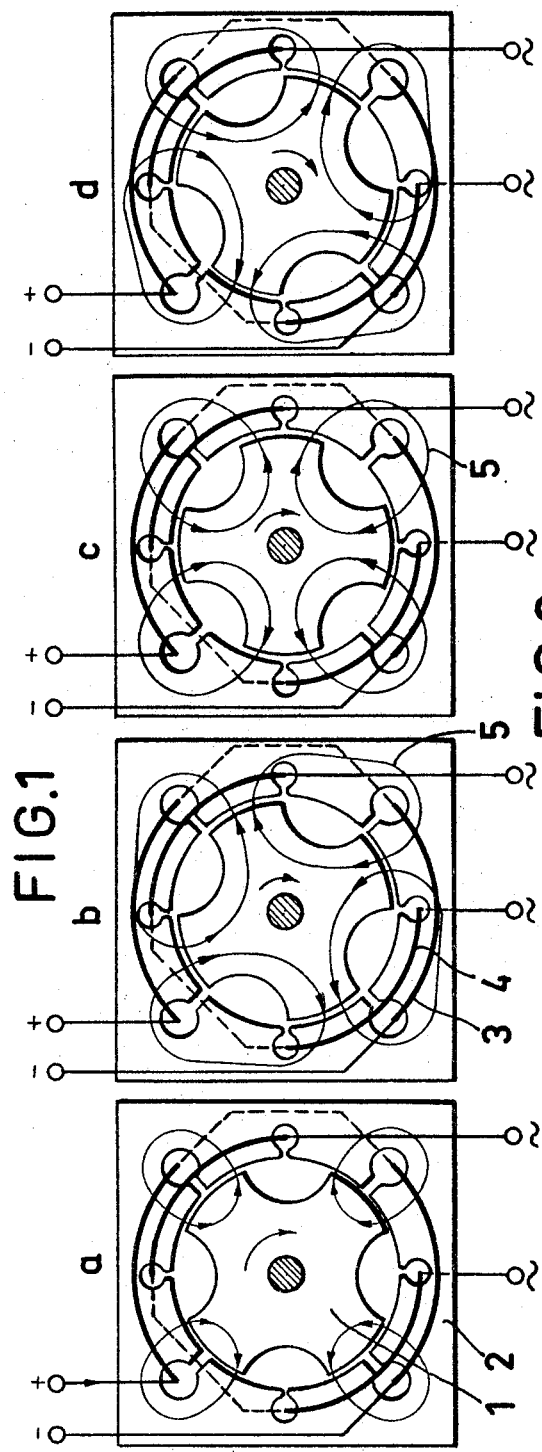
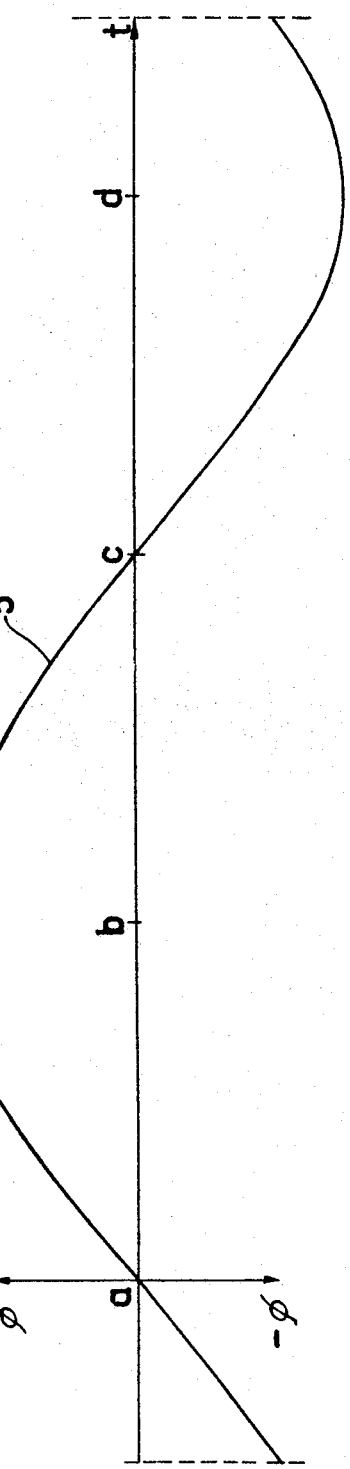

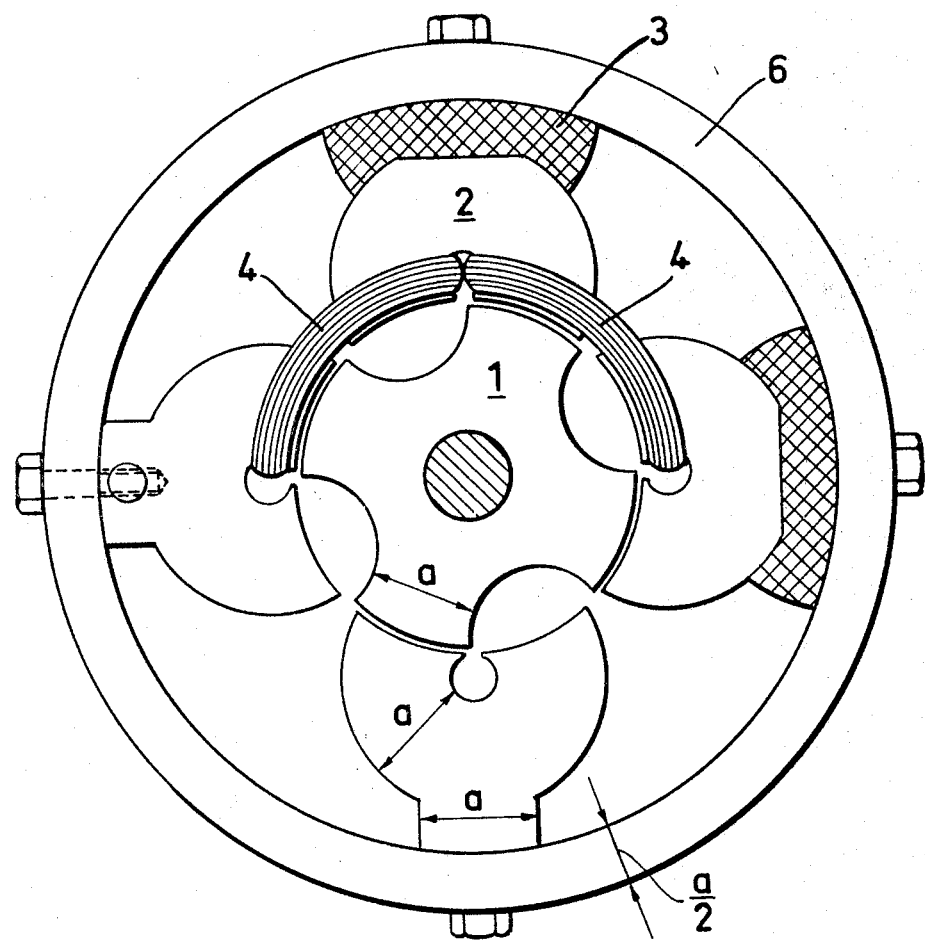

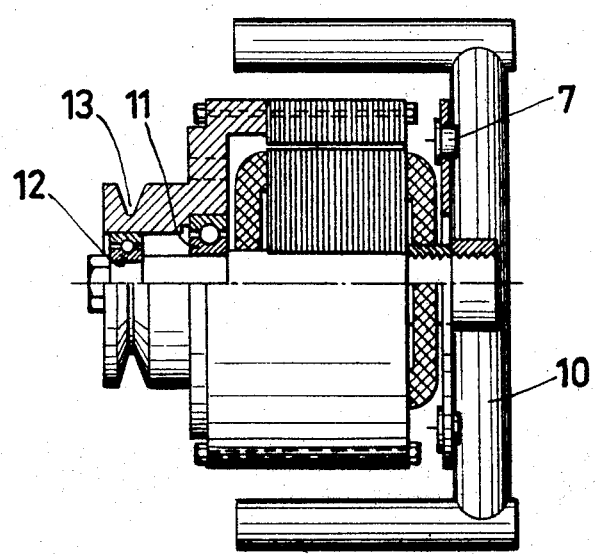
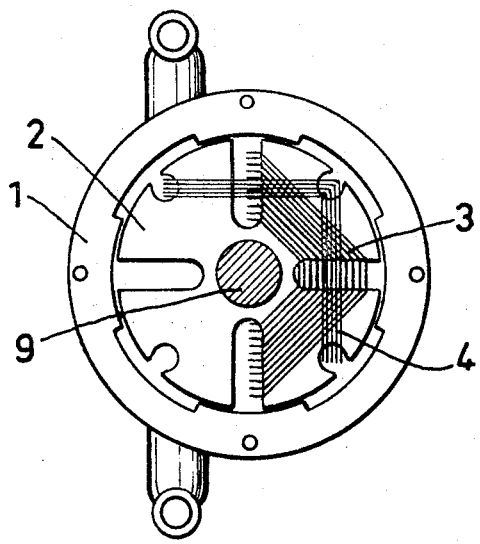
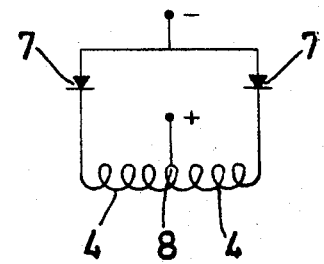

United States Patent Office 3,518,473
Patented June 30, 1970

3,518,473
ALTERNATING CURRENT GENERATOR WITHOUT SLIP RINGS AND BRUSHES
Knut Assar Nordebo, 28 Ringvagen,
Haparanda, Sweden
Filed May 24, 1968, Ser. No. 731,834
Claims priority, application Sweden, June 5, 1967, 7,836/67
Int. Cl. H02k 17/42
U.S. Cl. 310—168                                              5 Claims

ABSTRACT OF THE DISCLOSURE

An alternating current generator includes a multi-poled rotor element and a stator element having the same number of poles as the rotor. No windings are provided on the rotor element, and the stator element is provided with energization windings on the poles which are connected to a source of direct current as well as with power windings in which an alternating current output is produced as the rotor is rotated. The power windings are received in and extend between centrally located slots in the faces of adjacent stator poles and thus are displaced in phase by half a pole pitch as related to the pole windings.

---

The present invention relates to an alternating current generator without slip rings and brushes, in which the rotor has no winding and like the stator is made of for instance silicon sheet metal and which has the same number of poles in the rotor and the stator.

According to the invention this alternating current generator is characterized in that its excitation winding and its AC i.e. its alternating current power winding are both located in the stator and are mutually displaced half a pole pitch and are so arranged that a pulsating magnet flux, with alternating directions is generated in the AC winding when connecting the excitation winding to a direct current voltage and when rotating the rotor.

The invention will be explained more in detail in connection with the annexed drawing showing in FIG. 1 flow lines in four consecutive rotor positions between the stator and the rotor for one embodiment and moreover a flux diagram in FIG. 2 as a function of the time of this embodiment. In FIG. 3 another embodiment is shown and in FIGS. 4 and 5 still another. In FIG. 6 a current diagram is schematically illustrated.

The rotor 1 according to FIG. 1 has no winding and is like the stator 2 for instance made of silicon sheet metal, the number of poles in the rotor and in the stator being the same. The stator is provided with an excitation winding 3 and an AC winding 4, which are located in different slots and are mutually displaced half a pole pitch. Upon connection of the excitation winding 3 to a DC voltage and when turning the rotor, a pulsating magnet flux 5 with alternating directions (FIG. 2), is created in the AC winding 4. However, no corresponding pulsation arises in the excitation winding having the same number of poles as the AC winding. The flux curve appears from the drawing illustrating a four-pole generator.

The four part figures $a$, $b$, $c$ and $d$ in FIG. 1 show the generated magnet flux $\Phi$ after each revolution of the rotor 22, 5°, starting from position $a$. It appears that this position and the position $c$ will give the flux $\Phi$ in the AC winding, whereas the positions $b$ and $d$ will give maximum flux. Thus, each time a rotor pole passes a certain point on the stator, the flux curve describes one period. From this the known equation $f = p \cdot n/60$ follows, wherein $f$ is the frequency, $p$ the pole number and $n$ the number of revolutions per minute.

In practical operation the generator has appeared to have the corresponding characteristic and operating data of a slip-ring type synchronous generator.

It has appeared that the construction of the generator can be simplified within the scope of this invention without waiving its good qualities. What is moreover characterizing of the invention is then that the stator is equipped with salient poles, which are provided with an excitation winding around an iron area substantially comprising half a pole pitch and with an AC winding disposed in slots in the poles adjacent to the air gap so that the two windings will be mutually displaced half a pole pitch.

A generator with these main characteristics can be made in two different ways, that is with an inner rotor or with an outer rotor, and two embodiments showing this are represented in FIG. 3 and in FIGS. 4, 5, whereas FIG. 6 shows a method of interconnecting the AC windings of the generator.

In the embodiment according to FIG. 3 the excitation winding 3 is arranged around the salient poles 2 in the stator, which poles are attached to the inner side of a common pole ring 6 and enclose the rotor 1 having the same number of poles as the stator. As is evident from the drawing, the excitation winding 3 extends around an iron area on the pole comprising substantially half a pole pitch. The AC winding 4 is placed in slots in the poles of the stator, and the two windings are mutually displaced half a pole pitch. This embodiment has the advantage that the excitation coils can be made ready in advance, and be applied around the salient poles. In the figure certain dimensions $a$ are indicated, which should preferably be considered at the fabrication of the generator. The salient poles are for instance attached to the stator ring 6 by means of screws. A generator of the described type has relative to the first described generator the advantage that the demand for copper in the excitation winding will be less. The stator poles as well as the rotor can preferably be made as laminated constructions, whereas the stator ring 6 can preferably be made of solid iron. The stator ring 6 and the poles 2 can possibly be laminated combined with each other.

To reduce the outer diameter of such a generator it is suggested according to a further embodiment shown in FIG. 4 in a partially sectional side view and in FIG. 5 in an end view, that the generator is made with an outer rotor. The excitation winding 3 is then arranged around the salient poles 2 in the stator, which is mounted on a stationary shaft 9 and which is enclosed by the annular rotor 1 with inwardly directed poles. The AC winding 4 is as in the embodiment according to FIG. 3 disposed in slots in the stator poles, and even in this embodiment the two windings are mutually displaced half a pole pitch. The shaft 9 is threaded in and locked in a stand 10, and the rotor 1 is according to FIG. 4 mounted on the shaft by means of two ball bearings 11 and 12 and provided with a V-belt groove 13. In the stand two silicon diodes 7 are mounted in order to rectify the alternating current output of the generator, and their connection appears from FIG. 6. This figure shows the interconnection of the power windings 4 to a common point 8 and to the silicon diodes 7, the shown diode connection providing a plus pole at the tap 8 and a minus pole at the connection point of the diodes. According to this connection the generator is suitable for being used in automotive vehicles. According to the last-mentioned embodiment the demand for the least possible copper amount in the excitation winding is combined with the demand for the least possible outer dimensions of the generator.

What I claim is:

1. In an alternating current generator operating without slip rings and brushes the combination comprising a multi-poled rotor element mounted for rotation and having no windings thereon, a multi-poled stator element arranged concentrically with said rotor element, said stator element having the same number of poles as said rotor, an excitation winding provided on each pole of said stator, circuit means for connecting said excitation windings to a source of direct current so as to produce a series of north poles alternating with south poles, the face of each said stator pole being provided with a centrally located slot, and power windings equal in number to said excitation windings, each said power winding being received in and extending between said centrally located slots in adjacent stator poles thereby effecting a mutual displacement in phase as between said excitation and power windings of half a pole pitch, and circuit means interconnecting said power windings to each other and to a set of output terminals thereby to effect production of an alternating current output when said rotor is rotated and said excitation windings are energized by said direct current.

2. An alternating current generator as defined in claim 1 wherein the poles on said stator are of the salient type and each said excitation winding extends around an iron area on the pole comprising substantially half a pole pitch.

3. An alternating current generator as defined in claim 1 wherein the poles on said stator are of the salient type and said stator and its poles are built up from silicon sheet metal stampings.

4. An alternating current generator as defined in claim 1 wherein said stator element surrounds said rotor element.

5. An alternating current generator as defined in claim 1 wherein said rotor element surrounds said stator element and is provided with a grooved pulley for driving it in rotation, wherein said stator element is supported by a stand and said stand mounts a pair of diodes connected to said power windings for rectifying the alternating current output of said generator.

References Cited

UNITED STATES PATENTS

| | | | |
|---|---|---|---|
| 2,501,222 | 3/1950 | Hybler | 310—168 |
| 2,827,582 | 3/1958 | Krebs | 310—188 |
| 3,085,170 | 4/1963 | Brown | 310—188 |
| 3,157,810 | 11/1964 | Adkins | 310—188 |
| 3,184,628 | 5/1965 | Hammerstrom | 310—168 |
| 3,422,292 | 1/1969 | McCoy | 310—180 |

FOREIGN PATENTS 468,065   5/1937   Great Britain.

WARREN E. RAY, Primary Examiner

R. SKUDY, Assistant Examiner

U.S. Cl. X.R.

310—68, 180